United States Patent [19]

Abner

[11] Patent Number: 5,012,880

[45] Date of Patent: May 7, 1991

[54] MINI-AMBULANCE

[76] Inventor: Jerry L. Abner, 11760 Oxford Rd., Germantown, Ohio 45327

[21] Appl. No.: 522,738

[22] Filed: May 14, 1990

[51] Int. Cl.[5] .......................... B60Q 3/02; A61G 3/00

[52] U.S. Cl. .................................... 180/89.11; 296/19

[58] Field of Search .................. 180/89.11, 89.10, 908; 296/19, 37.1, 37.6; 362/35, 61, 249

[56] References Cited

U.S. PATENT DOCUMENTS

| | | | |
|---|---|---|---|
| 2,278,450 | 4/1942 | Jones | 296/24 |
| 2,387,186 | 10/1945 | Schofield | 296/19 |
| 4,225,153 | 8/1980 | Bez et al. | 280/788 |
| 4,273,374 | 6/1981 | Portman | 296/19 |
| 4,339,146 | 7/1982 | Lehmann | 296/19 |
| 4,425,978 | 1/1984 | Star | 180/243 |
| 4,677,896 | 7/1987 | Litvinoff | 89/36.08 |
| 4,685,719 | 8/1987 | Hanemaayer | 296/156 |

FOREIGN PATENT DOCUMENTS

| | | | |
|---|---|---|---|
| 116232 | 8/1926 | Switzerland | 296/19 |

*Primary Examiner*—Charles A. Marmor
*Assistant Examiner*—Karin Tyson
*Attorney, Agent, or Firm*—Ralph L. Marzocco

[57] ABSTRACT

A medically equipped mini-ambulance for use in providing emergency medical treatment and in transporting the injured and sick from a remote site to a medical treatment facility is disclosed. A material transport is adapted to accommodate emergency and scene lighting, housings for medical equipment and supplies, patient cot platform, attendant chair, and convertible roof.

10 Claims, 2 Drawing Sheets

MINI-AMBULANCE

BACKGROUND OF THE INVENTION

1. Field of the Invention

The present invention generally relates to a medically equipped ambulance. More particularly, the invention relates to a mini-ambulance for use in providing emergency medical treatment and for transporting the injured and sick from a remote site over rugged and nearly impassable terrain to a medical treatment facility or hospital.

2. Description of the Prior Art

It is well known that emergency medical treatment at times must be administered at a remote site and the injured and sick must be transported from the remote site over rugged and nearly impassable terrain to a medical treatment facility or hospital. However, there is presently lacking adequate means for servicing remote sites since existing ambulances are primarily suited for traveling over paved roadways.

Ambulances or motor vehicles with suitable appliances for transporting the injured and sick to medical treatment facilities have been disclosed and utilized. Representative of the prior art are the motor vehicles described in U.S. Pat. No. 2,278,450 (Jones), 2,387,186 (Schofield), 4,225,153 (Bez et al.), 4,273,374 (Portman), 4,339,146 (Lehmann), 4,425,978 (Star), and 4,677,896 (Litvinoff).

The patents issued to Schoefield, Bez et al., Portman, and Lehmann generally involve ambulances which are not capable of transporting the injured and sick over rugged terrain and which are not equipped to render sophisticated emergency treatment. While the patient issued to Star generally involves an ambulance not capable of transporting the injured or sick over rugged terrain. And the patents issued to Jones and Litvinoff generally involve ambulances not equipped to render sophisticated emergency medical treatment.

None of the referenced patents discloses a mini-ambulance for providing emergency medical treatment and for transporting the injured and sick from a remote site over rugged and nearly impassable terrain to medical treatment facilities and hospitals. Additionally, none of the referenced patents discloses a medically equipped mini-ambulance that can also be driven upon all kinds of playing fields without disturbing the playing surface and maneuver through outdoor crowds, shows, races, and the like.

Presently, whenever human injury and sickness arises in a remote site, medical personnel must carry medical supplies and equipment to the site and then carry the injured and the sick to an ambulance that awaits on a roadway. Consequently, a needs exists for an ambulance that is drivable over rugged terrain. Such approach should comprise the unique combination of features that are embodied in the present invention.

SUMMARY OF THE INVENTION

Underlying the present invention is the realization that in order to have needed medical equipment and trained personnel for providing emergency medical treatment at a remote site, first, medical equipment and trained personnel must be transported to the remote site, and second, means must be available to remove the injured and sick from such sites over rugged terrain to medical treatment facilities and hospitals.

In accordance with the teachings of the present invention an approximately eight feet long and five feet wide custom painted mini-ambulance which is drivable over terrain too rugged to be traveled by ordinary ambulances comprises an engine, transmission, and gear ratio capable of transporting a driver, attendant, injured or sick person, and medical equipment - net weight approximately 800 pounds—up a 20° grade. A multi-wheel pulling drive assembly contributes to good traction while wide, low pressure, flotation type tires contribute to a smooth, comfortable ride for the injured and sick. The mini-ambulance is provided with a level indicator, an hour meter, a digital clock, a volt meter, a multiple mode electronic siren, flasher warning lights, a rear step bumper, side skirts, a radio, a rotatable attendant seat, a convertible top, a patient care and rear compartment light controlled by either driver or attendant, and a master switch to all accessories switches. The mini-ambulance is further provided with a patient care compartment which houses a defribrillator-monitor, oxygen cylinders, a drug box, equipment to facilitate full advanced cardiac life support, and a channeled cot mount platform for supporting a removable stretcher and for storing an immobilizing spine board.

The primary advantages of such medically equipped mini-ambulance is its capability of providing emergency medical treatment at a remote site and for transporting the injured and sick from a remote site over rugged and nearly impassable terrain to a medical treatment facility. These and other advantages and attainments of the present invention will become apparent to those skilled in the art upon a reading of the detailed description when taken in conjunction with the drawings wherein there is shown and described an illustrative embodiment of the invention.

BRIEF DESCRIPTION OF THE DRAWINGS

For a further understanding of the nature and object of the invention, reference should be had to the detailed description of the exemplary embodiment taken in connection with the appended drawings in which.

DETAILED DESCRIPTION OF THE INVENTION

Figure 1:
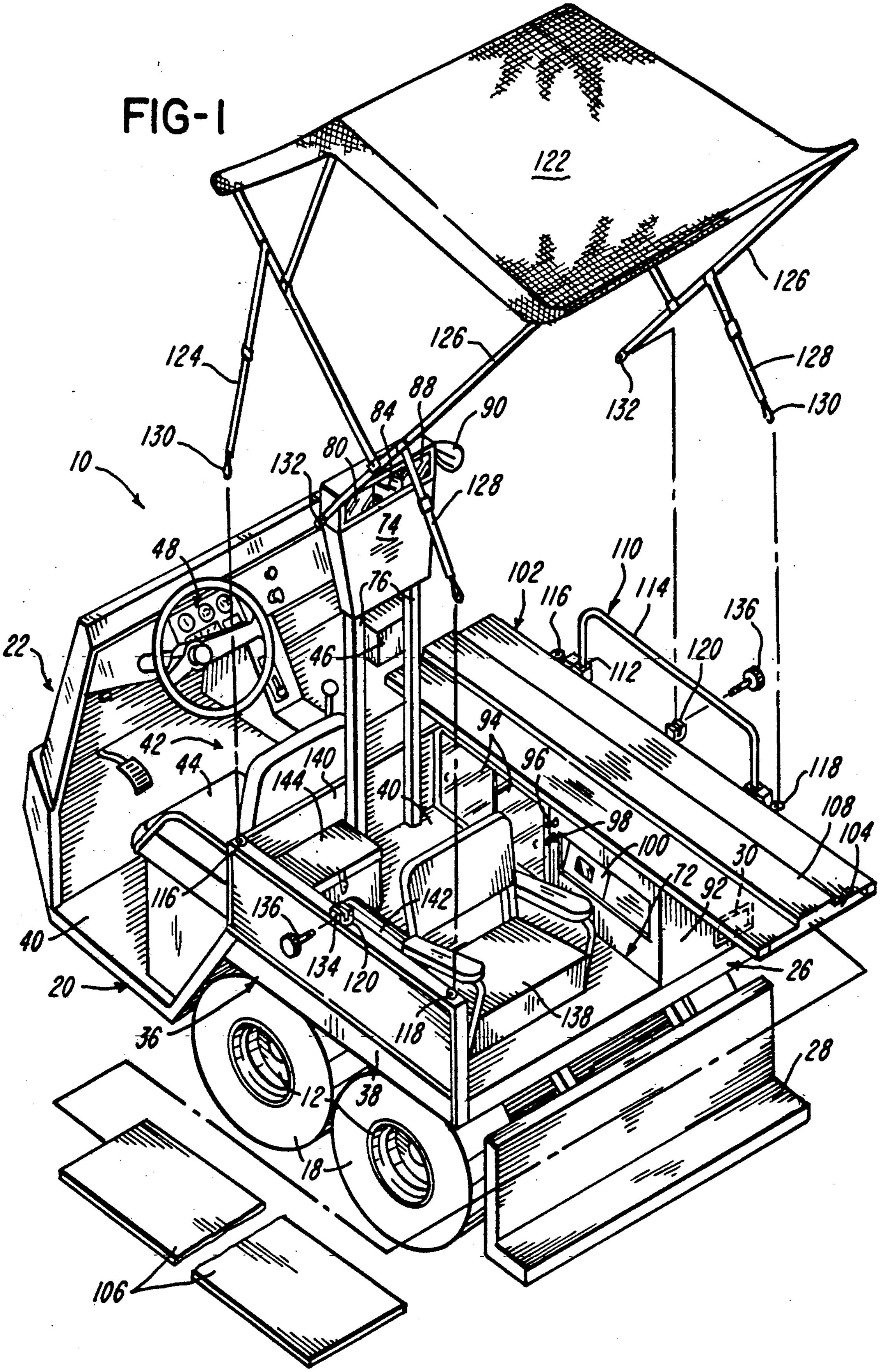
FIG. 1 is a rear perspective view of the mini-ambulance of this invention.

In the following description, like reference characters designate like or corresponding parts throughout the several view of the drawings. Additionally, in the following description, it is to be understood that such terms as "forward", "rearward", "left", "right", "upwardly", "downwardly", and the like, are words of convenience and are not to be construed as limiting terms.

Figure 2:
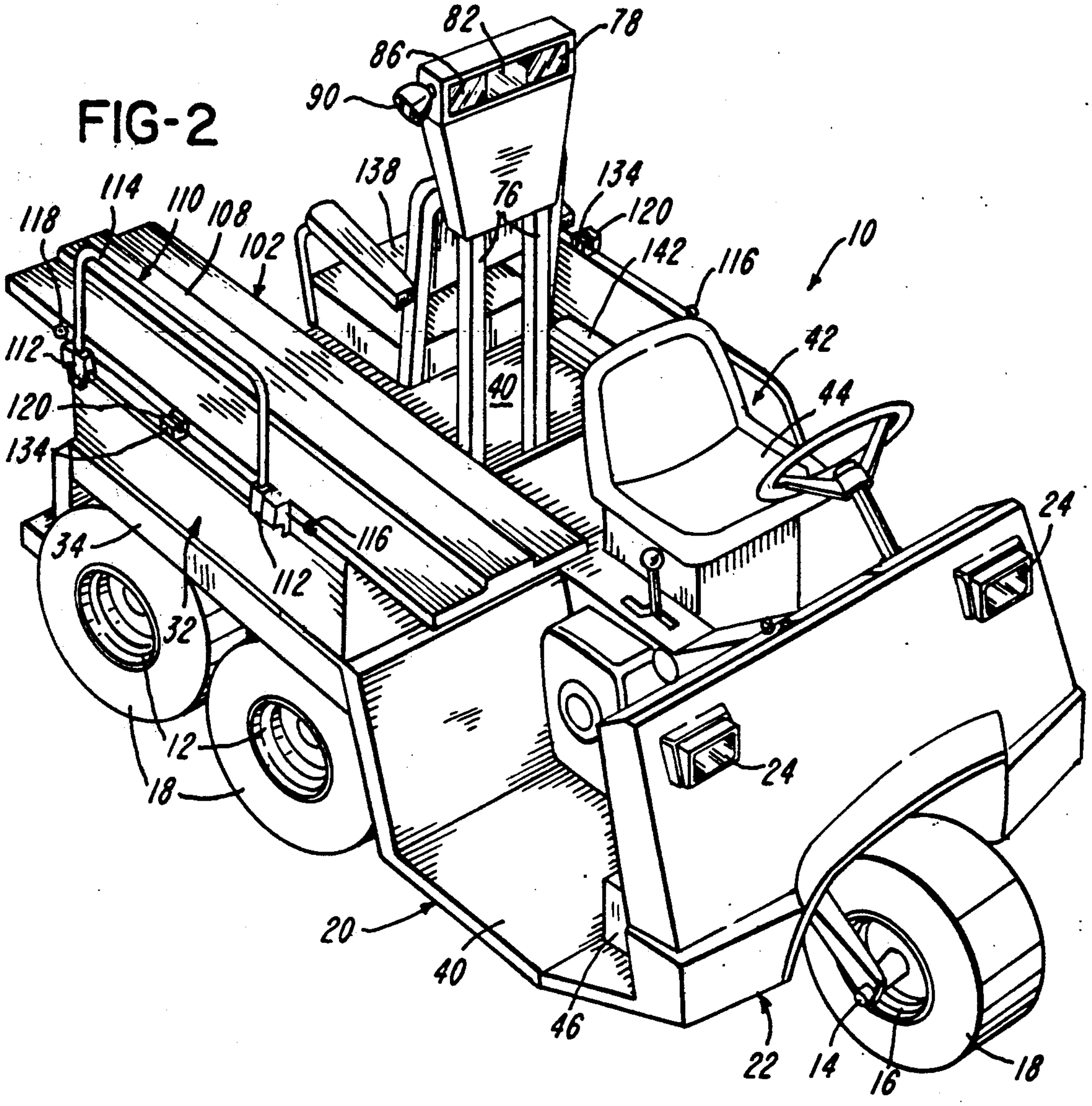
FIG. 2 is a front perspective view of the mini-ambulance of this invention.
Figure 3:
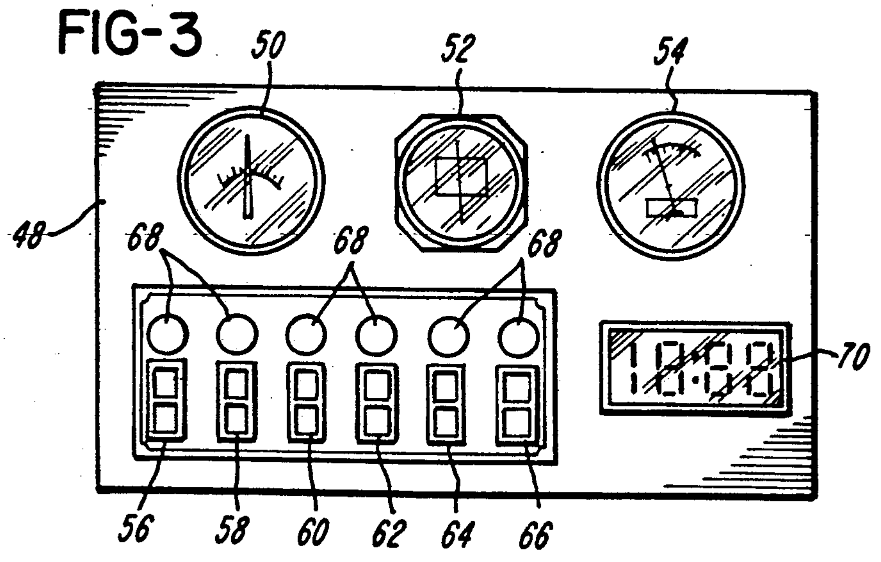
FIG. 3 is a plan view of an instrument panel of the mini-ambulance of this invention.

Referring now to the drawings, and particularly to FIGS. 1 and 2, there is illustrated a mini-ambulance, generally designated by the numeral 10 and constituting the preferred embodiment of the present invention. Mini-ambulance 10 utilizes a framework and a vehicle body 20 of a commercially available material transport, a John Deere "AMT 622 All Materials Transport". The respective length and width of the AMT 622 transport are approximately 8.5 feet and 4.5 feet. The transport with a 600 pound payload capacity includes high flotation tires, tandem drive, a locking differential for extra traction in tough, slippery conditions, and a variable speed automatic transmission.

Connected to the drive means assembly (not shown) of the framework (not shown) of mini-ambulance 10 are a plurality or rotatable wheels 12. Connected to a front axle 14 of mini-ambulance 10 is a steerable, rotatable wheel 16. Mounted on each one of rotatable wheels 12 and 16 is a wide, low pressure, flotation type, pneumatic tire 18.

Vehicle body 20 has a front end 22 with a pair of headlights 24, a back end 26 with a step bumper 28 and a taillight 30, a right side 32 with a right side skirt 34, a left side 36 with a left side skirt 38, and a floor 40. Additionally, vehicle body 20 is compartmentalized into a driver section 42 and a patient care section 72. Driver section 42 has, in addition to the standard means for operating an AMT 622 transport (such as a steering wheel, brake and accelerator pedals, forward and reverse lever, and key switch), a driver seat 44, a trauma drug medical box 46, and a dash mounted instrument panel 48.

Instrument panel 48 of driver section 42 includes a plurality of indicators and accessory controlling switches. As a driver seated in seat 44 would view panel 48 (reading from left to right) on the upper portion of panel 48 are an alternator indicator dial 50, a grade steepness and tilt indicator dial 52, and an hour maintenance indicator dial 54. On the lower portion of panel 48 (reading from left to right) are a flashing red light toggle switch 56, a flashing white light toggle switch 58, a nonflashing front white light toggle switch 60, a nonflashing rear white light toggle switch 62, a patient care section white light master toggle switch 64, and a multiple mode electronic siren toggle switch 66. Located directly above each one of toggle switches 56-66 is a separate fuse receptable 68 for a fuse (not shown) to each circuit (not shown). And located below dial 54 in the lower portion of instrument panel 48 is a digital clock 70.

Patient care section 72 includes means for providing emergency lighting from an elevated position above floor 40. An emergency lights' housing 74 is elevated above floor 40 by a plurality of support posts 76, each of which is affixed at its one end to floor 40 and at its other end to housing 74. Housing 74 generally defines a box-like structure whose upper forward and rearward portion contain a plurality of emergency lights with each forward directed light having a rearward directed counterpart.

Included in housing 74 are means for forwardly directing a flashing red light 78 directly behind which are means for rearwardly directing a flashing red light 80, and adjacent to red light means 78 and 80 are means for forwardly directing a white light 82 (controllable by an operator to be flashing for emergency warning or non-flashing for site illumination) behind which are means for rearwardly directing a white light 84 (likewise controllable by an operator to be flashing or nonflashing), and adjacent to white light means 82 and 84 are means for forwardly directing a flashing red light 86 directly behind which are means for rearwardly directing a flashing red light 88. Attached to the upper Portion of one side of housing 74 are means for directing a patient care light 90 to right side 32 of patient care section 72. Power to lights 78–90 is controlled by toggle switches 56–64 of instrument panel 48.

Affixed to floor 40 on the right side 32 of patient care section 72 is an elongated compartmentalized housing 92 for storing medical supplies and equipment. Entry to the compartment for storing medical supplies from patient care section 72 is through a pair of sliding doors 94. In addition to providing space for storing medical supplies, inside the compartment is a light fixture (not shown) which is controlled by a first toggle switch 96 located adjacent to sliding doors 94. Below toggle switch 96 is a second toggle switch 98 which controls patient care light 90. The other compartment of housing 92 provides space for a defibrillator monitor 100.

Forming the top portion of housing 92 is an elongated platform 102 which generally defines a parallelepiped having an internal chamber 104 running the entire length of platform 102 which chamber 104 is used to store an immobilizing spine board 106. The upper side of platform 102 includes an elongated centerrail 108 for accommodating a patient cot (not shown).

On the outerside of elongated platform 102 is a safety bar assemblage 110 having a mounting block 112 that affixes assemblage 110 to the right side 32 of vehicle body 20. Mounting block 112 includes a locking mechanism (not shown for locking a 180° rotatable safety bar 114 in a raised position to help secure the injured or the sick to a patient cot (not shown) atop elongated platform 102. Safety bar 114 can be unlocked and rotated 180° from the raised position to a lowered position to facilitate the removal of a patient cot (not shown) from elongated platform 102 or the placement of a patient cot (not shown) onto elongated platform 102.

Atop upper right side 32 and upper left side 36 of patient care section 72 are affixed one each side a forward eyelet 116 and rearward eyelet 118 between which is affixed a threaded yoke 120. Attached at one of their ends to a convertible roof 122 on each side are a forward strut 124, a center strut 126, and rearward strut 128. The other ends of struts 124 and 128 have a snap fastener 130 for removably securing convertible roof 122 to forward eyelet 116 and rearward eyelet 118. The other end of center strut 126 is flat and has a hole 132 alignable with a hole 134 of threaded yoke 120 for removably securing convertible roof 122 to threaded yoke 122 with threaded pin 136.

Toward the back end 26 of patient care section 72 between left side 36 and elongated housing 92 rotatably affixed to floor 40 is an attendant arm chair 138. If circumstances so dictate, the top of a front wall 140 of patient care section 72 behind driver seat 44 and the top of attendant arm chair 138 can be used to support spine board 106 or a second patient cot (not shown).

In patient care section 72 directly behind attendant arm chair 138 and secured to the wall of left side 36 is an oxygen cylinder 142. Located in the corner formed by the intersection of front wall 140 with the wall of left side 36 of patient care section 72 is a lockable container 144 for storing medical equipment such as a stethoscope, blood pressure cuff, and the like.

The above described mini-ambulance is designed to transport the injured and sick from a remote site over rugged and nearly impassable terrain to a medical treatment facility. It carries the required equipment and supplies needed to provide emergency treatment.

It is thought that the present invention and many of its attendant advantages will be understood from the foregoing description and it will be apparent that various changes or modifications may be made in the form, construction, and arrangements of the parts thereof without departing from the spirit and scope of the invention or sacrificing all of its material advantages, the form hereinbefore described being merely a preferred or exemplary embodiment thereof.

The invention having been described, what I claim is:

1. A mini-ambulance for providing emergency medical treatment and for transporting the injured and sick from a remote site over difficult terrain to a medial treatment facility, which comprises:

a motor vehicle for transporting an operator, attendant, injured and sick, and medical supplies and equipment, which comprises (i) a vehicle body having a front end, a rear end with a step bumper, two sides each with wheel skirts, and a floor defining an operator section and a patient care section, (ii) means for operating the motor vehicle, and (iii) a plurality of rotatable wheels having a plurality of pneumatic tires;

an operator seat and a plurality of dash mounted indicators and accessory controlling switches in the operator section from which seat the operator is able to drive the motor vehicle and to operate the accessory controlling switches;

a housing for emergency lights generally defining a box-like structure affixed to a plurality of support posts that are affixed to the floor of the patient care section;

an elongated housing for medical equipment and supplies generally defining a box-like structure parallelly adjacent to one of the two sides and affixed to the floor of the patient care section, the top of the housing having affixed thereto an elongated platform for supporting a cot;

a rotatable attendant arm chair rearwardly affixed to the floor of the patient care section;

a convertible roof for the patient care section removably attached to the sides of the motor vehicle; and an oxygen cylinder and a lockable container for medical equipment located in the front left area of the patient care section.

2. The mini-ambulance according to claim 1, wherein the motor vehicle utilizes a framework and a vehicle body of a commercially available material transport.

3. The mini-ambulance according to claim 2, wherein the respective length and width of the commercially available material transport are approximately 8.5 feet and 4.5 feet.

4. The mini-ambulance according to claim 1, wherein the dash mounted indicator include an alternator indicator, a grade steepness and tilt indicator, an hour maintenance indicator, and a digital clock.

5. The mini-ambulance according to claim 1, wherein the accessory switches control a plurality of emergency and site lights.

6. The mini-ambulance according to claim 1, wherein the elongated housing for medical equipment contains a defibrillator monitor.

7. The mini-ambulance according to claim 1, wherein a safety bar contributively secures the injured or the sick to a patient cot atop the elongated platform.

8. The mini-ambulance according to claim 7, wherein the safety bar is rotatable to facilitate the removal of a patient cot from the elongated platform or the placement of a patient cot onto the elongated platform.

9. The mini-ambulance according to claim 1, wherein the plurality of emergency and site lights of the patient care section have a forward directed light with a rearward directed counterpart.

10. The mini-ambulance according to claim 1, wherein the patient care section includes an immobilizing spine board.

* * * * *